March 29, 1966 P. E. HUMPHREY 3,243,022
AUTOMATIC BRAKE ACTUATING SYSTEM WITH FEEDBACK CONTROL VALVE
Filed April 2, 1964 3 Sheets-Sheet 1

INVENTOR.
PAUL E. HUMPHREY
BY
Knox & Knox

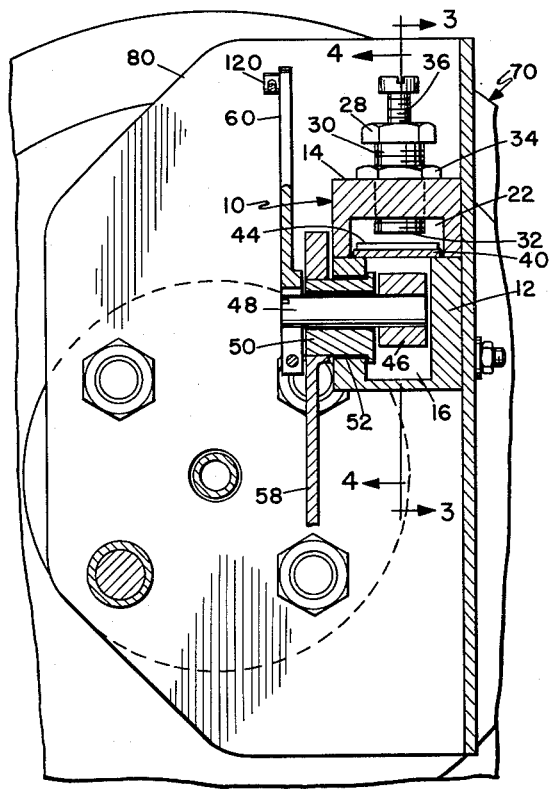
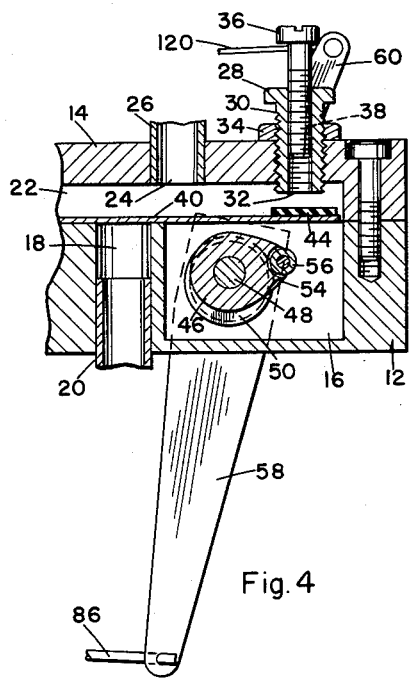
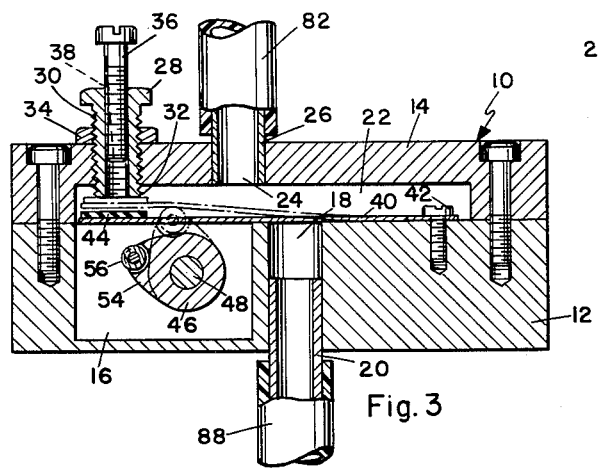
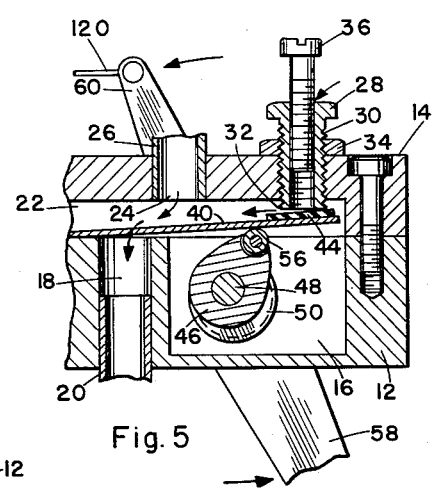
Fig. 2
Fig. 4
Fig. 3
Fig. 5
INVENTOR.
PAUL E. HUMPHREY
BY Knox & Knox March 29, 1966  P. E. HUMPHREY  3,243,022
AUTOMATIC BRAKE ACTUATING SYSTEM WITH FEEDBACK CONTROL VALVE
Filed April 2, 1964  3 Sheets-Sheet 3

INVENTOR.
PAUL E. HUMPHREY
BY
Knox & Knox

3,243,022
AUTOMATIC BRAKE ACTUATING SYSTEM WITH FEEDBACK CONTROL VALVE
Paul E. Humphrey, 7665 Central, Lemon Grove, Calif.
Filed Apr. 2, 1964, Ser. No. 356,717
9 Claims. (Cl. 192—3)

The present invention relates to vehicle brakes and more specifically to an automatic brake actuating system with a feedback control valve.

*Prior art*

A number of brake systems have been developed in which the brakes are applied automatically when the throttle is closed, the usual brake pedal being eliminated. A servo is necessary to apply sufficient pressure to the brake system master cylinder and this can be vacuum operated, or powered by other suitable means. Release of the throttle control pedal actuates the servo, which causes the brakes to be applied. By using elaborate valve means some degree of control can be provided for the braking pressure, but the action is usually abrupt. That is, in these prior art devices, once the system is actuated, the brakes are fully applied, and if the system is set up to apply initial braking only, with the brakes never fully applied, then the conventional brake pedal must be retained and used to stop the vehicle completely.

*Objects*

The primary object of this invention is to provide an automatic brake system incorporating a simple servo control valve which has feedback fully proportional to the servo travel and results in brake action which is proportional to the motion of the throttle control, the action being gradual or sudden as required according to the degree and rate of travel of the throttle control pedal.

Another object of this invention is to provide an automatic brake system in which the control valve has a single, cam controlled valve element, feedback motion being applied directly to the cam in a very simple arrangement.

Another object of this invention is to provide an automatic brake system having a linkage between the throttle control pedal and the throttle itself which incorporates a certain amount of lost motion, so that the vehicle can coast or decelerate by itself without braking being applied.

Another object of this invention is to provide an automatic brake system in which the actuating force is very low, requiring no special springs on the throttle control pedal.

A further object of this invention is to provide an automatic brake system which is adaptable to virtually all existing vehicles, requiring only simple connections to the throttle linkage, brake pedal and vacuum source, the conventional brake pedal being retained for normal use if required, although the brake pedal can be eliminated.

*Drawings*

FIGURE 2 is an enlarged sectional view of the control valve taken on line 2—2 of FIGURE 1;

FIGURE 3 is a sectional view taken on line 3—3 of FIGURE 2;

FIGURE 4 is a fragmentary sectional view taken on line 4—4 of FIGURE 2, with the valve in driving position;

FIGURE 5 is a similar sectional view with the valve in braking position;

Similar characters of reference indicate similar or identical elements and portions throughout the specification and throughout the views of the drawing.

*Control valve*

Figure 1:
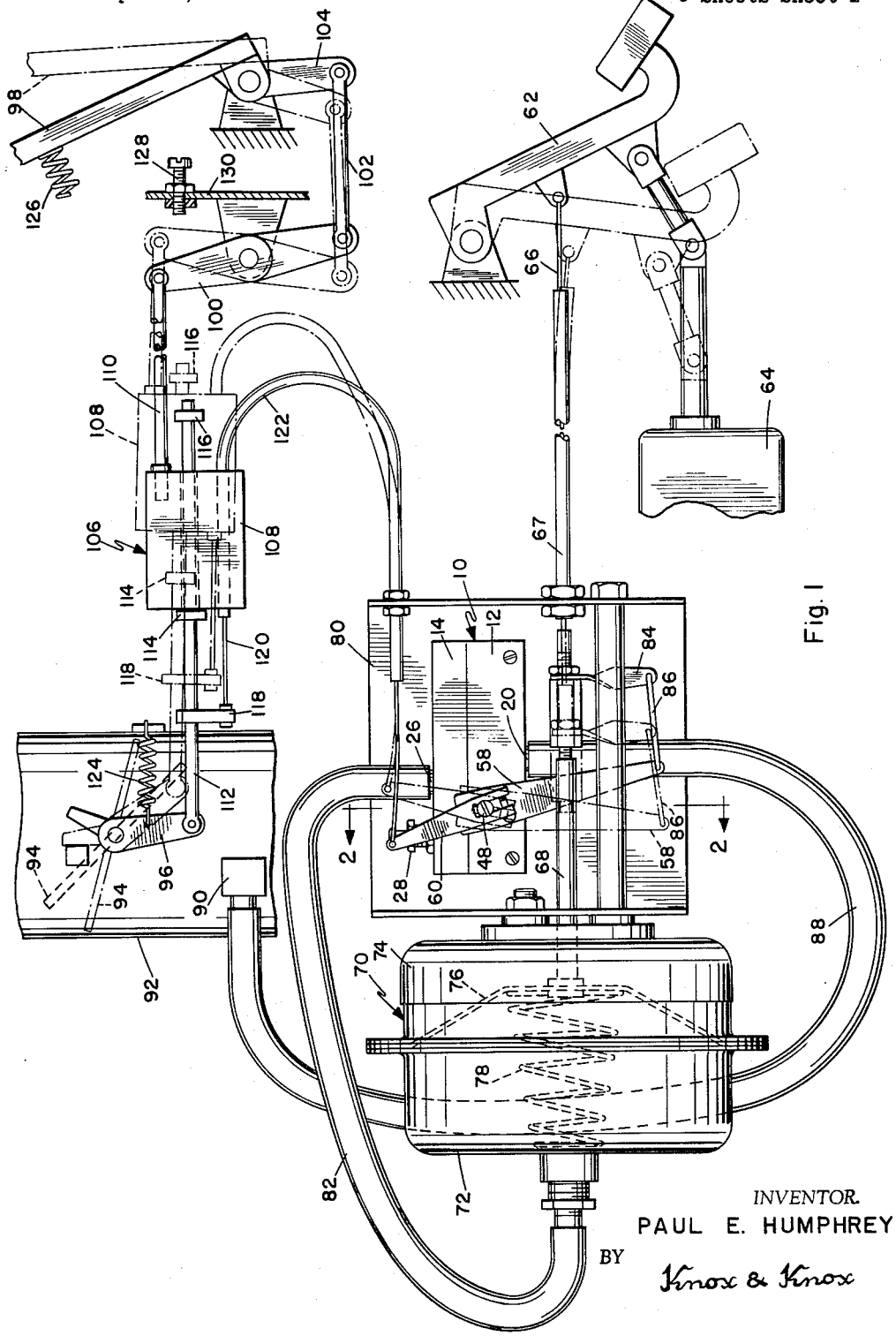
FIGURE 1 is a somewhat diagrammatic view of the complete system.

The smooth proportional brake control action is provided by a single control valve 10 of very simple construction. The control valve 10 is preferably of rectangular block form for simplicity and has a body 12 with a removable top portion 14. At one end of body 12 is a cavity 16 adjacent which is a vacuum inlet 18 fitted with a connecting tube 20. Top portion 14 has a shallow chamber 22 with an outlet 24 fitted with a connecting tube 26. Mounted in top portion 14 is a regulator 28 comprising a sleeve 30 screw threaded into the top portion and having an inner end with an open port 32 extending into chamber 22 have the cavity 16, said sleeve being adjustable and being held in place by a lock nut 34. Sleeve 30 is internally threaded to receive a regulating screw 36 having a longitudinally tapered groove 38, so that by adjusting the screw the rate of air flow into chamber 22 through port 32 can be accurately controlled.

On top of the body 12 and within chamber 22 is an elongated, flat valve element comprising a resilient reed 40, which covers inlet 18 and extends across the cavity 16, said reed being secured to the body at the end remote from said cavity by a screw 42. On the free end of reed 40 is a pad 44 of compressible material, such as rubber or the like, which will seat over the port 32 of sleeve 30 when the reed is lifted.

In the cavity 16 is a cam 46 fixed to a shaft 48 which is journalled in an eccentric bushing 50, said bushing being rotatably mounted in one side wall 52 of the cavity. Cam 46 has a single lobe 54 fitted with a roller 56 to ride against the underside of reed 40 with minimum friction. Fixed to bushing 50 outside the body 12 is a radially extending feedback arm 58, and secured to the outer end of shaft 48 is a control arm 60. The cam 46 is positioned so that roller 56 engages the reed 40 just inboard of pad 44, or toward the fixed end of the reed. In the fully raised position the reed 40 is thus bowed over the roller 56 so that pad 44 lies flat against the sleeve end completely closing port 32, as in the broken line position in FIGURE 3.

*Brake system*

The system is illustrated as coupled to a conventional pivotally mounted brake pedal 62 operating a hydraulic master cylinder 64 and is applicable to manually or power operated brakes, not shown. Alternatively the brake petal can be removed and the system coupled directly to the master cylinder.

The brake pedal 62 is actuated by a push-pull, flexible actuating cable 66 extending from the piston rod 68 of a vacuum powered actuator 70. Cable 66 is of the well known type with an outer sheath 67 in which the cable itself slides. The actuator 70 has a vacuum chamber 72 and a static chamber 74 separated by a flexible diaphragm 76 to which piston rod 68 is attached, the diaphragm being biased into the static chamber by a return spring 78. This basic type of vacuum actuator is well known and is capable of developing considerable pull or thrust from a moderate vacuum. Actuator 70 is mounted on a bracket 80, on which is also secured the control valve 10, outlet connecting tube 26 of said valve being connected to the vacuum chamber 72 by a hose 82. On the piston rod 68 is a coupling arm 84 connected by a link 86 to the end of feedback arm 58, so that linear travel of the piston rod causes said feedback arm to swing, the end of cable sheath 67 being fixed to bracket 80 causing cable 66 to slide therein.

The vacuum inlet 18 is connected by a hose 88 to a vacuum connection 90 on the engine carburetor, indicated fragmentarily at 92, most vehicles having a suitable take off connection. The throttle or butterfly valve 94, actuated by an arm 96 is normally connected substantially directly to the pivoted throttle pedal 98, the typical linkage illustrated in FIGURE 1 including a pivoted rocker arm 100 coupled by a link 102 to an actuating arm 104 on the pedal. Various mechanical linkages are used according to the particular vehicle. In this brake system the connection between rocker arm 100 and butterfly arm 96 is replaced by a lost motion linkage 106, which includes the block 108 from which a fixed rod 110 is connected to said rocker arm. A connecting rod 112 from arm 96 extends slidably through block 108 and is fitted with spaced stops 114 and 116 to limit the motion. The exact spacing of the stops will depend on the arrangement and travel of the various linkage components. Fixed to connecting rod 112 is a tie bar 118, to which is secured one end of a push-pull type control cable 120, the other end of the cable being attached to control arm 60 on the valve 10. Cable 120 has an outer sheath 122, one end of which is fixed to bracket 80 and the other end secured in block 108.

The butterfly valve 94 is biased to a closed position by a spring 124 on arm 96 and throttle pedal is biased to engine idle position by a return spring 126, the arrangement being conventional and subject to variation. To provide for adjustment of brake action a sensitivity adjustment screw 128 is mounted on convenient supporting structure 130 adjacent rocker arm 100, to limit the return of the arm when throttle pedal 98 is raised. A similar adjustment device could be attached to pedal 98 or to another convenient portion of the linkage, the purpose being to limit the travel of block 108 after the butterfly 94 is closed.

*Operation*

In FIGURE 1, the cruising or driving position of the system, with the vehicle in motion and the brakes off, is indicated in full line and the brakes partially applied position in broken line.

Figure 7:
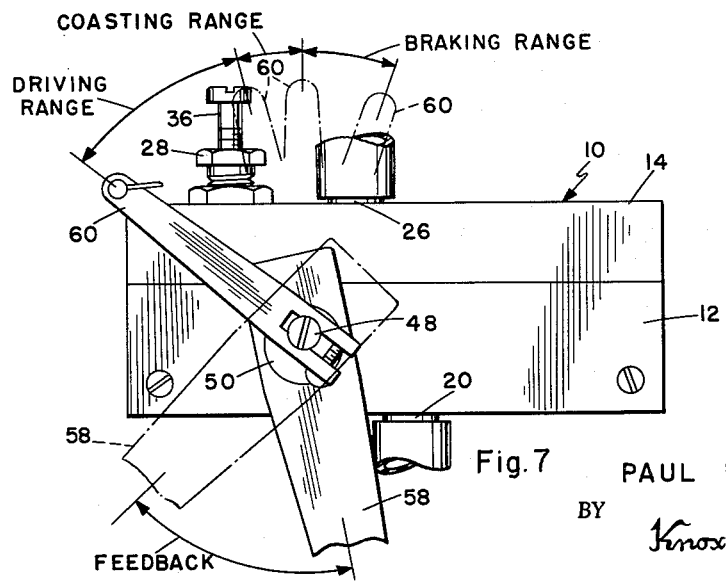
FIGURE 7 is a side elevation view of the valve showing the operating ranges.

In the driving position the throttle pedal 98 is depressed, causing the block 108 to be pushed against stop 114 and opening the butterfly 94. Cable 120 moves relative to its sheath 122 and pushes control arm 60 into the driving range of its travel, the various ranges being indicated in FIGURE 7. In this position the cam 46 is held clear of reed 40, which is seated firmly over vacuum inlet 18 and is held in place by the vacuum and its own resiliency. The vacuum chamber 72 is vented to atmosphere through outlet 24 and regulator 28.

When throttle pedal 98 is partially raised, as when decelerating or coasting, the butterfly 94 closes to idling position and block 108 is pulled away from stop 114. With the lost motion coupling the linkage is arranged so that there is a reasonable amount of pedal travel with the butterfly remaining in idle position. For a short distance of travel of control arm 60 the valve is in the coasting range, with cam 46 approaching engagement with reed 40. This ensures that the brakes will not be applied unintentionally every time the engine is throttled back to idling position. As the throttle pedal 98 is raised further, the control arm 60 moves into the braking range and cam 46 is rotated until roller 56 engages and lifts the reed 40. This action uncovers the inlet 18, opening chamber 22 to the vacuum source, while at the same time the pad 44 is raised to obstruct port 32 of regulator sleeve 30. From chamber 22 vacuum is applied to vacuum chamber 72, causing diaphragm 76 to be pulled against spring 78, so pulling cable 66 and depressing brake pedal 62 to apply the brakes by actuating master cylinder 64.

In a sudden stop the throttle pedal 98 is completely released and control arm 60 moves to the end of braking range travel, the cam 46 raising the reed 40 to its fullest extent and pressing pad 42 firmly over the port 32, as in broken line position in FIGURE 3. With the air bleed closed, full braking action is applied rapidly.

In normal driving abrupt brake action is undesirable and can be dangerous in heavy traffic, so brake application is smoothed out and made proportional to throttle pedal motion. However, emergency braking action is available by sudden and complete release of the throttle pedal when necessary.

Figure 6:
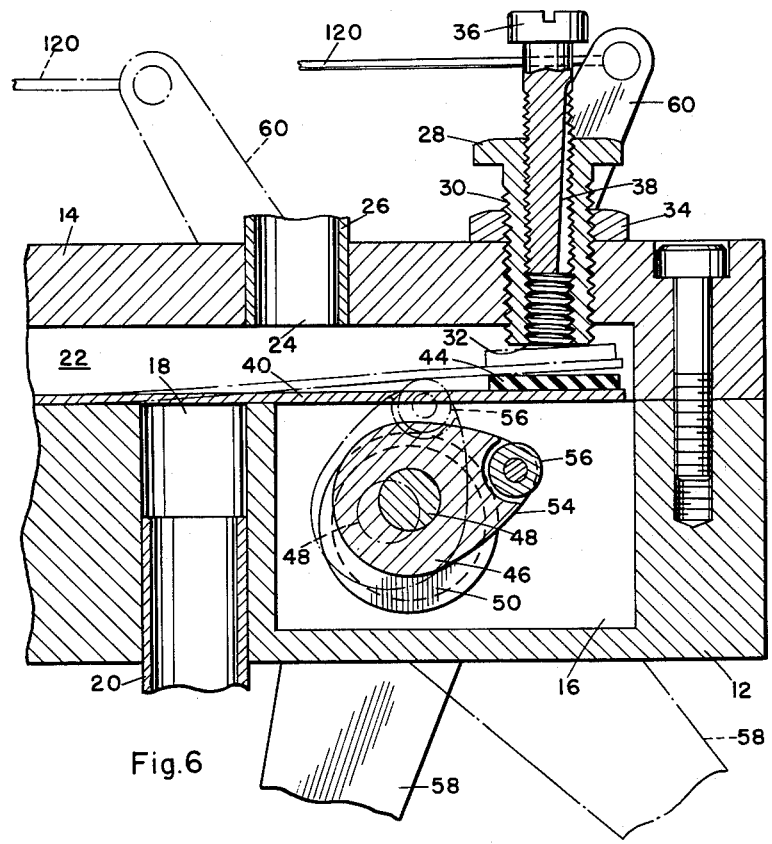
FIGURE 6 is a further enlarged sectional view illustrating the feedback action in the valve.

As the cam 46 raises the reed 40 and causes the brakes to be applied, the linear motion of piston 68, through coupling arm 84 and link 86, swings the feedback arm 58 and rotates the eccentric bushing 50. This moves the rotational axis of cam 46 away from reed 40 and retards the action of the cam on said reed, as will be apparent from the two positions indicated in FIGURE 6. The port 32 is not allowed to become fully closed and the air bleed through groove 38 relieves the vacuum in a controlled manner to prevent full brake action. At the same time the reed 40 re-closes the inlet 18 a slight amount, also proportional to brake action, so reducing vacuum in a controlled manner. Thus the actual brake applying motion is fed back to the controlling valve in a mechanical closed loop, providing fully proportional, feedback damping of the brakes. By proper design of the cam and eccentric bushing, together with their actuating arms, the feedback ratio can be set to suit specific brake systems. Regulator 28 provides for fine adjustment after installation for adaptation to a particular vehicle or an individual's requirements.

When the throttle pedal 98 is depressed to accelerate the vehicle, the initial travel of the lost motion linkage 106 returns the control arm 60 and cam 46 to the coasting range and then to the driving range, allowing reed 40 to shut off vacuum inlet 18 and cause the brakes to be released. Spring 78 returns the diaphragm 76 to its normal position and avoids any retarding of brake pedal return. The brakes are released before block 108 engages stop 114 and opens the butterfly 94, but this occurs rapidly during normal pedal depression and there is no danger of the vehicle rolling back, as on a hill, since a natural slight lag in the brake system action allows the engine to start driving the vehicle as the brakes are completing their disengagement.

If the vehicle brake system or individual preference is such that total braking is not required, the adjustment screw 128 can be set to limit the travel of block 108 by stopping rocker arm 100 before the end of its travel. This prevents full range of motion of cam 46 to the position at which regulator 28 is completely closed, so retaining a certain amount of air bleed. The adjustment may be desirable for initial familiarization with the system, until the dual operation of the throttle pedal becomes instinctive. As illustrated, the brake pedal 62 is retained and is still operative in the conventional manner, so that an instinctive movement of the foot to the brake pedal in an emergency will merely add to the action of the automatic system. This arrangement makes the system adaptable to existing vehicle without changing the normal controls, and simplifies the learning of a modified driving technique without danger.

The system is operative only when the engine is running, unless a separate vacuum source is used, the brakes being applied as soon as the engine is started with the throttle in idle position. The vehicle is thus prevented from creeping during engine warm-up.

Installation of the system in a vehicle is very simple. The actuator and valve assembly is mounted in a convenient position, such as on the side of the engine compartment, to provide a reasonably straight run for the actuating cable 66, which is attached to the brake pedal. The lost motion linkage 106 is then connected in place of the usual unitary link rod between the throttle arm 96 and the pedal linkage, and hose 88 is coupled to the vacuum source.

Smooth operation of the system is made possible by the very simple valve 10, with a single moving valve element, the reed 40, which opens and closes the vacuum inlet and simultaneously controls the surge preventing air bleed. The valve is all mechanical, including the simple feedback, which is consistently accurate and directly proportional to brake action, no elaborate pressure sensors or electrically actuated compensation means being required.

It is understood that minor variation from the form of the invention disclosed herein may be made without departure from the spirit and scope of the invention, and that the specification and drawings are to be considered as merely illustrative rather than limiting.

I claim:

1. An automatic brake actuating system for a vehicle having an engine, throttle control means operatively connected to the engine, vacuum operated brake actuating means, and a source of vacuum, the brake actuating system, comprising:
    a vacuum control valve having an inlet, an outlet and a valve opening and closing element;
    said brake actuating means being coupled through said valve to said source of vacuum;
    an actuating arm operatively connected to said valve element and being coupled to the throttle control means to open said valve automatically when the throttle is closed;
    and feedback means engaging said valve element and being connected to the brake actuating means to retard the motion of the valve element in proportion to the brake applying motion of the actuating means.

2. A system according to claim 1 and including a variable bleed port in said valve;
    said valve element having a portion movable to close said port progressively as the valve is opened.

3. A system according to claim 1 and including lost motion linkage in said throttle control means having connecting means operatively connected to said actuating arm;
    said lost motion linkage having stop means engageable to move said connecting means and said actuating arm after the throttle is closed.

4. An automatic brake actuating system for a vehicle having an engine, throttle control means operatively connected to the engine, a vacuum operated brake actuator, and a source of vacuum, the brake actuating system, comprising:
    a vacuum control valve having an inlet connected to said source of vacuum and an outlet connected to said actuator;
    a valve element in said valve normally closing said inlet;
    a cam engageable with said valve element to move the valve element and open said inlet;
    an actuating arm fixed to said cam and being connected to the throttle control means to open said inlet when the throttle is closed;
    and feedback means coupled between said cam and the brake actuator to retard the motion of the cam in proportion to the brake applying motion of the actuator.

5. A system according to claim 4 wherein said feedback means includes an eccentric bushing in which said cam is rotatably mounted;
    and a feedback arm connected between said bushing and the brake actuator to rotate the bushing as the actuator operates.

6. A system according to claim 5 and including a variable vacuum bleed regulator having a port opposed to said inlet;
    said valve element having a portion to cover said port when the valve element is moved to open said inlet.

7. A control valve for use in a vacuum operated brake system, comprising:
    a body having an internal chamber;
    an inlet and an outlet communicating with said chamber;
    a valve element secured at one end to said body and normally covering said inlet;
    a cam rotatably mounted in said body and having a lobe engageable with said valve element to lift the valve element away from said inlet;
    and means to shift the rotational axis of said cam relative to said valve.

8. A valve according to claim 7 wherein said means to shift the rotational axis of said cam comprises an eccentric bushing in which said cam is mounted.

9. A valve according to claim 7 and including a variable bleed port in said chamber;
    the other end of said valve element having a portion to cover said port when the valve element is lifted away from said inlet.

References Cited by the Examiner

UNITED STATES PATENTS

| | | | |
|---|---|---|---|
| 1,403,517 | 1/1922 | Miller | 251—259 |
| 1,447,908 | 3/1923 | Staude | 192—3 |
| 2,015,192 | 9/1935 | Russell | 192—3 |
| 2,152,060 | 3/1939 | Kliesrath | 192—3 |

DAVID J. WILLIAMOWSKY, *Primary Examiner.*